United States Patent
Haller et al.

(10) Patent No.: US 10,528,042 B2
(45) Date of Patent: Jan. 7, 2020

(54) METHOD OF MONITORING A MODULAR PROCESS PLANT COMPLEX WITH A PLURALITY OF INTERCONNECTED PROCESS MODULES

(71) Applicant: ABB Schweiz AG, Baden (CH)

(72) Inventors: Axel Haller, Gorxheimertal (DE); Chaojun Xu, Weinheim (DE); Mario Hoernicke, Landau (DE); Rainer Drath, Mannheim (DE); Ralf Jeske, Petershagen (DE)

(73) Assignee: ABB Schweiz AG, Baden (CH)

( * ) Notice: Subject to any disclaimer, the term of this patent is extended or adjusted under 35 U.S.C. 154(b) by 199 days.

(21) Appl. No.: 15/667,301

(22) Filed: Aug. 2, 2017

(65) Prior Publication Data
US 2018/0039261 A1 Feb. 8, 2018

(30) Foreign Application Priority Data

Aug. 2, 2016 (EP) .................................... 16001701

(51) Int. Cl.
*G05B 9/02* (2006.01)
*G05B 23/02* (2006.01)

(52) U.S. Cl.
CPC ..... *G05B 23/0221* (2013.01); *G05B 23/0267* (2013.01); *G05B 23/0272* (2013.01);
(Continued)

(58) Field of Classification Search
USPC .......................................................... 700/79
See application file for complete search history.

(56) References Cited

U.S. PATENT DOCUMENTS 8,479,097 B2   7/2013  Husoy et al.
2009/0210814 A1*  8/2009  Agrusa .............. G05B 23/0267
                                                      715/772

(Continued)

FOREIGN PATENT DOCUMENTS

EP         1611713 A1    1/2006
EP         2801941 A1   11/2014
WO       200102953 A1    1/2001

OTHER PUBLICATIONS

European Search Report Application No. 16001701.8 Completed Date: Mar. 2, 2017; dated Mar. 30, 2017 10 Pages.

*Primary Examiner* — Md Azad
(74) *Attorney, Agent, or Firm* — Whitmyer IP Group LLC

(57) ABSTRACT

A system for monitoring a modular process plant complex having a plurality of interconnected process modules each of which includes a plurality of interconnected physical control objects. The physical control objects and their interconnections inside a physical process module are displayed together with associated control parameters as stylized control objects on an operator display screen with four different zooming levels: a first zooming level displaying diagrams of aggregated key performance indicators of the plant complex; a second zooming level displaying diagrams of the key performance indicators; a third zooming level displaying process modules associated with a plant area of the second zooming level; and a fourth zooming level displaying one or more physical control objects included in a process module of the third zooming level together with the associated control parameters and interconnections as stylized control objects on the operator screen display.

14 Claims, 7 Drawing Sheets

(52) U.S. Cl.
CPC .............. *G05B 2219/23163* (2013.01); *G05B 2219/31473* (2013.01)

(56) References Cited

U.S. PATENT DOCUMENTS

| | | | |
|---|---|---|---|
| 2010/0017746 A1* | 1/2010 | Husoy | G06F 3/0484 715/781 |
| 2012/0062567 A1 | 3/2012 | Baier et al. | |
| 2012/0254792 A1* | 10/2012 | Husoy | G06F 3/0481 715/782 |
| 2014/0303754 A1* | 10/2014 | Nixon | G05B 23/0267 700/83 |
| 2015/0077263 A1* | 3/2015 | Ali | G05B 23/0216 340/679 |
| 2018/0216842 A1* | 8/2018 | Turney | F24F 11/30 |

* cited by examiner

METHOD OF MONITORING A MODULAR PROCESS PLANT COMPLEX WITH A PLURALITY OF INTERCONNECTED PROCESS MODULES

TECHNICAL FIELD

The invention is related to a method of monitoring a modular process plant complex with a plurality of interconnected process modules according to the present invention.

BACKGROUND

For controlling large industrial plants as e.g. gas processing facilities or chemical production plants with hundreds of different devices like electric motors, pumps, reactors, motorized valves, sensors etc., which are hereinafter called control objects, industrial control systems are used. The known industrial control systems usually include electric control systems like field bus systems to which the control objects are electrically connected and over which the data for controlling the control objects as well as sensor data is transmitted to a main computer system. The information about the actual state of the physical control objects like the input flow rate of chemical components which are fed to a chemical reactor or the flow rate and opening positions of control values or the speed and torque of an electric motor, etc. are displayed as stylized objects on large display screens for each control object or for groups of control objects, in order to give the operators an overview of the active state of the process plant. A method and an associated control system of the aforementioned type are disclosed in WO 2001002953A1.

In order to reduce the amount of information displayed on the screen of large process plants, U.S. Pat. No. 8,479,097 B2 suggests a user interface which provides operator screens on which one or more of the stylized objects on the display screen can be selected and grouped by means of a computer mouse. Afterwards, the actual status of the selected group of objects can be displayed as a thumbnail image in a separate window on the same display screen by clicking on an associated tab which is located at the lower end of the display screen. This allows the operator to instantly obtain actual information about process parameters of control objects. According to FIG. 2 of this document, the user interface allows the operator to display alarm or warning messages together with key performance indicators like the main output of the plant, in one thumbnail image, in order to help the operator locate the control objects which have caused the alarm message.

SUMMARY

Moreover, in 2010 the applicant of the subject application has presented an industrial control system named Hawkeye which uses a traditional display screen on which stylized control objects associated with physical control objects involved in the process are displayed on an operator screen display. In order to obtain more information about the actual status of each control object, different zooming levels are provided starting from a first top level, in which only the main components of a plant are displayed. By zooming in from this first top level which can be done by clicking on one of the main components, the operator can get to a second level which provides a more detailed view of a subsection of the plant, e.g. a reactor with the feeding and discharging devices, without showing any details of each control object. By clicking on one of the stylized objects in the display screen in the second zooming level, each of which represents several grouped control objects, the operator gets to a third zooming level where he can click on one of the grouped control objects involved, in order to get to a fourth zooming level. In this fourth zooming level, the operator can retrieve detailed information about the physical control objects like the speed of motors, flow rate of pumps, values measured by sensors or control parameters of controllers, so that he can interact in the process in case that a malfunction occurs.

However, although the Hawkeye control system provides for a good monitoring and comfortable operator interaction when controlling an industrial process plant, it does not allow the operator to display any key performance indicators on the display screen which are generally known and hereinafter designated as KPIs. These KPIs may include, but are not limited to the performance (total parts produced to the production rate), quality (percentage of good parts out of the total parts produced), cycle time (total time from the beginning to the end of the process) or output of components per time as well as energy consumption per time of the plant or of its main components/physical control objects.

Moreover, the applicant's Hawkeye control system only allows to display alarm messages for a single control object, which makes it difficult for an operator to trace back the actual cause of an alarm, because a malfunction in one of the physical control objects usually causes a chain of further additional alarm signals in subsequent control objects all over a plant.

As an alternative to the Hawkeye control system, applicant provides a further control system with an operator display in which only the most important impact factors for the operation of a plant are displayed as KPIs with the associated history/time line on the operator display. The operator directly sees if deviations appear in the KPI history so that he can react on steering the process in one or the other direction using the impact factors which e.g. can include media level and pump runtime.

The aforementioned industrial plant control systems which are provided for worldscale plants are usually designed once, because the underlying process changes only very little throughout plant lifecycle. As a consequence, industrial plant control systems like the Hawkeye System or the KPI-based System can be used, because operators have to learn the operation and the process of the plants only once.

In contrast to traditional process plants, modular process plants change more often. Modular process plants are assemblies of more or less independent process modules. Compared to worldscale plants, modular plants are more flexible and are more often reconfigured. This also means that the operator screens and the underlying processes changes more frequently. In this respect, for the owners of the plants, it is not affordable to have extensive operator training after each reconfiguration.

Accordingly, it is a problem of the present invention to provide a method of monitoring a modular process plant complex which allows for an improved visualization of the plant complex and enables an operator to locate malfunctions of control objects in plant modules more easily.

This problem is solved by a method of monitoring a modular process plant complex comprising the features disclosed hereinbelow.

Further objects of the present invention are included in the dependent claims.

According to a first object of the invention a method of monitoring a modular process plant complex having a plurality of interconnected process modules each of which includes a plurality of interconnected physical control objects, comprises the step of displaying the physical control objects and their interconnections inside a physical process module together with associated control parameters as stylized control objects on an operator screen display in different zooming levels. The control objects can be any kind of controllable devices like a reactor for chemical substances with feeding pumps and sensors, a pumping module with associated control valves, shutoff valves, flow meters and sensors or a filling and packaging module with associated drive motors and sensors in which the final products are filled into bottles or other containers and packaged for shipping. For controlling the controllable objects and modules, each of the objects is electrically connected to an industrial bus system, like a bus system named factory bus which is connected to at least one central computer which is hereinafter referred to as a host computer.

The host computer displays the control parameters and sensor data etc. on the operator screen display in order to give the operator the information about the state of each control object or process module which is required to supervise the production process and change the parameters if necessary.

The method is characterized in that in a first zooming level with least detail information, diagrams which are preferably timelines of aggregated key performance indicators of the plant complex are displayed on said operator screen display. Said aggregated key performance indicators are aggregations of associated key performance indicators of physical process modules in different plant areas. By means of the aggregated key performance indicators which may include, but are not limited to the overall output of a plant complex, the quality of the products produced in one of the plants of the plant complex, the cycle time for producing a product or the output of components per time unit as well as the energy consumption of one plant or the entire plant complex, which are preferably displayed exclusively as a timeline, an operator gets an immediate overview if the production process of the plant complex is in a target corridor or not.

In a second zooming level which can be elected by clicking with a pointing device on the diagrams of the aggregated key performance indicator in zooming level 1, diagrams, preferably timelines of said key performance indicators are displayed together with stylized images of the associated plant areas on said operator display screen. This second zooming level which provides only displays of the plant areas allows an operator to retrieve more detailed information on basis of the KPIs which are related only to this specific plant area without being overwhelmed by a flood of technical detail information about the control parameters of each process module which is located in this plant area.

Moreover, in a third zooming level, to which the operator can preferably switch to by clicking with a pointing device on the diagrams of a key performance indicator or the associated plant area displayed in the second zooming level, the process modules associated with this key performance indicator or plant area and the physical control objects included in each of said process modules are displayed on the operator screen display as low detail stylized process modules and low detail stylized control objects in a stylized view of said plant area. In other words, by switching from the second zooming level to the third zooming level, the operator switches from a solely KPI-based operator screen display to a screen display in which the process modules are displayed in stylized form with only the main components of the control objects, like a reactor housing, a pump symbol, a schematic conveyor belt etc., in order to reduce the flood of information displayed and thus provide a good overall overview of the relevant groups of control objects.

From this third zooming level, the operator can switch to a fourth zooming level by clicking with a pointing device on one or more of the stylized control objects in one of the process modules if he wants to get more detailed information about the actual control parameters, sensor values and interconnections between the physical control objects which are included in the selected process module of said third zooming level. The selected control objects and the associated actual control parameters, sensor values and interconnections between the physical control objects are then displayed with more detail information as stylized control objects on the operator screen display.

The invention provides for the advantage that due to the KPI-based visualization of the plant complex and the plant areas in the first and second zooming level in combination of the visualization of the process modules and the control objects in the third and fourth zooming level, an operator can get a very quick and intuitive overview of a plant complex at a glance without being overwhelmed by a flood of detail information about each control object of the plant complex itself. When monitoring large plant complexes with hundreds of interconnected process modules each of which including up to 50 or more physical control objects, the method according to the present invention makes it possible at all that an operator can recognize malfunction at a glance and can retrieve the cause of an error which occurred in an associated physical control object within minutes or even several seconds.

As already mentioned before, in the preferred embodiment of the invention, the diagrams of the aggregated key performance indicators in the first zooming level and/or the stylized images of the plant areas in the second zooming level and/or the stylized process modules and stylized control objects in the stylized view of the plant area in the third zooming level can be selected by means of an electronic pointing device in order to display a subsequent zooming level with an increased detail information on said operator screen display. In the same way, by activating a return button which is preferably also displayed on the operator screen display, but which may also be embodied as a conventional push button, the operator can return to a previous zooming level and/or jump back from the third or fourth zooming level to the first one.

As an alternative, the switching between two zooming levels on the operator display screen can be done by pressing a button, which is preferably a mouse button of the pointing device or a key on a keypad.

According to another aspect of the present invention, the control parameters in each of the physical control objects of each process module are monitored and an alarm signal is generated for a control object if a control parameter exceeds a predefined threshold value. If an alarm signal is generated for two or more physical control objects which is usually the case due to the interconnections of the physical control object within one process module, the alarm signals of all physical control objects included in that process module are aggregated to an aggregated first alarm signal and the aggregated alarm signal is displayed inside or next to the stylized (low detail) process module which includes the physical control object(s) that generated the alarm on said operator display screen in said third zooming level.

The aggregation of alarm signals provides for the advantage that in case of a mal-function which affects several control objects in one process module, the number of displayed alarms is reduced in the first zooming level which is the basic screen display for an operator as well as in the second and third zooming level, when he is monitoring a plant complex running in a normal operation mode, that is an operation mode in which no malfunctions occur. As a result the information displayed is extremely compacted and reduced to the essential information which is necessary to monitor a plant or a plant complex running in a normal operation mode with no malfunctions. If a malfunction occurs in one or more of the control objects, the operator is instantly notified by the alarm signal which may pop up on the operator display screen of the first zooming level in a different color and/or accompanied with an acoustical alarm.

According to another object of the present invention the aggregated alarm signals of two or more process modules each of which includes at least one physical control object that generated an alarm signal, are aggregated to an aggregated further second alarm signal. This further second alarm signal is displayed inside or next to the stylized image of the associated plant area in the second zooming level which includes the process modules causing the further alarm signal. This leads to the advantage that an operator can intuitively identify the plant area and the process modules located therein which caused the alarm on basis of the key performance indicators only. This tremendously reduces the amount of detail information about the defective control objects involved. As a result, the operator can identify one or more of the process modules which include at least on defective control object at a glance and get to the next zooming level, in order to get more detail information about the control object(s) which caused the alarm.

In order to even further reduce the amount of information which is not relevant for retrieving a defective control object causing an error, the further alarm signals of at least two plant areas that include physical control objects which generated an alarm, are aggregated to a further third alarm signal which is displayed next to the timeline of a KPI that is associated with the associated plant areas in said first zooming level.

In this respect it might be advantageous to display a process module including two or more control objects which generated an alarm signal as a stylized process module which may be highlighted in different colors depending on the number of defective control objects included therein, in order to further reduce the flood of non-relevant information for the operator.

According to an even further embodiment of the present invention, the key performance indicators in the first and/or second zooming levels are monitored and an alarm signal is generated and displayed if a key performance indicator exceeds a predefined upper or lower threshold value, and that based on the key performance indicators and alarm signals, a recommendation for corrective action is retrieved from a memory and displayed on the operator screen display. This helps an operator in case of a temporary overdrive of a control parameter or a temporary malfunction to take the correct steps which are necessary to change the associated control parameters of the affected control objects in such a way that the associated process module returns to a normal operation mode again.

In accordance with another object of the present invention, at least two, but preferably all four of the aforementioned zooming levels are displayed on the operator screen display as an overlapping images at the same time. This can be accomplished either automatically when an alarm signal is generated by one of the control objects, or by pressing a separate button on the operator display screen or a keyboard.

In order to provide for the possibility to follow up the propagation of an alarm signal in the plant complex between the at least two zooming levels, the locations where alarm signals are generated and displayed in a lower zooming level are marked up in the overlapping image of this zooming level and are graphically interconnected with the associated alarm locations in the overlapping image of the next higher zooming level by one or more connecting lines which are displayed in the overlapping images on the operator screen display. This method of displaying the generated alarm signals in several overlapping images of the associated zooming levels provides for the advantage that in case of an alarm, the operator can view the different locations where the cause of e.g. an accumulated alarm signal is generated in combination with the plant areas or the KPIs which are affected by the defective control objects/process modules.

More specifically, in this embodiment of the invention, at least one connecting line interconnects two or more of the stylized control objects in which an alarm signal was generated in the overlapping images of the fourth zooming level with an associated first aggregated alarm signal in or next to a process module in the third zooming level. A further advantage with regard to an improved overview of the important items on the operator display screen can be obtained if the control objects are displayed in the overlapping image of the fourth zooming level with reduced detail information as stylized images, in which only the alarm signals are marked up, e.g. as colored circles around the defective parts of a control object.

Moreover, there is also the possibility to add one or more additional images to the image of the fourth zooming level, in which even more detailed information, i.e. about control parameters or measured sensor values which lie outside a predefined thresh-hold value, is required, if in a large plant complex, the information density in the fourth zooming level becomes too large to be overlooked by an operator at a glance.

In an even more specific embodiment of the invention, one or more connecting lines interconnect one or more of the aggregated alarm signals which are displayed inside or next to a process module in the third zooming level of the overlapping image with an associated second aggregated alarm signal which is displayed inside or next to an associated stylized image of an affected plant area in the second zooming level. By this, the operator can easily and in a very short time track the process modules which have generated an alarm signal in one or more of the plant areas which are displayed as stylized images with reduced detail information in the overlapping image on the operator display screen.

In the preferred embodiment of the invention, at least one connecting line interconnects an aggregated alarm signal which is displayed inside or next to an associated stylized image of the associated plant area in the second zooming level of the stylized overlapping image with an aggregated third alarm signal which is displayed next to the timeline of a key performance indicator in said first zooming level. By means of this, an operator can instantly track back the relevant plant areas which include the control objects that have caused an alarm signal when this alarm signal is displayed all in a sudden in the first basic zooming level due to a malfunction when the plant complex runs in normal operation mode.

According to yet another object of the present invention, the alarm signals may additionally be displayed together with the associated cause and effect matrixes by means of which the alarm signals are generated by aggregation on the operator screen display in one or more of the afore mentioned zooming levels. This provides for the advantage that an operator can immediately retrieve the logical interconnections behind the alarm signals which are generated and displayed in the different zooming levels or in the overlapping images thereof, in order to track the actual cause of a an alarm.

BRIEF DESCRIPTION OF THE DRAWINGS

The invention is hereinafter described with reference to the accompanying drawings. In the drawings

DETAILED DESCRIPTION

Figure 1:
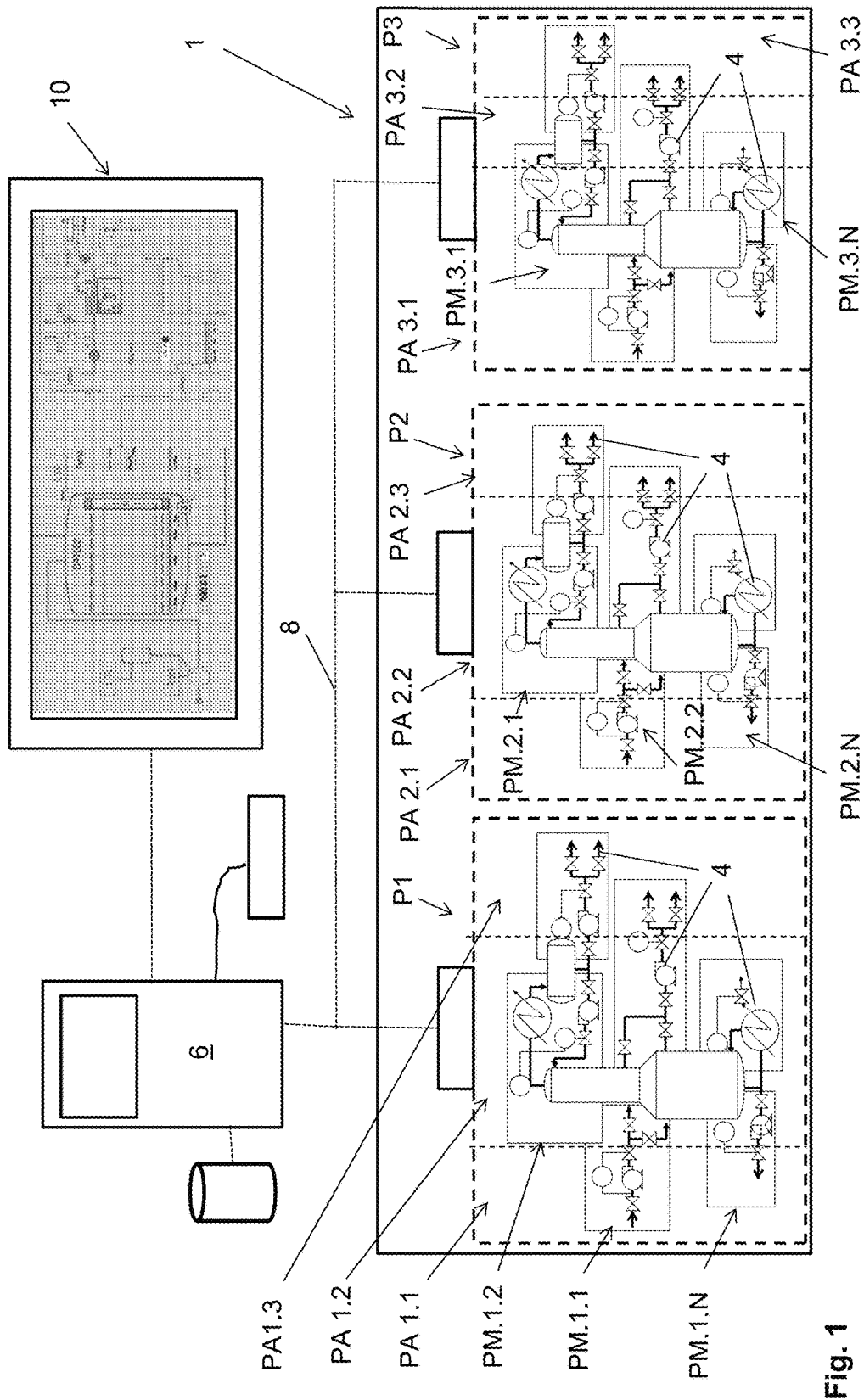
FIG. 1 shows a schematic overview of a plant complex with three modular process plants arranged in three different plant areas each having several process modules including a plurality of physical control objects, which are controlled via an industrial bus system by a host computer and an operator screen display connected thereto.

As it is shown in FIG. 1, an exemplary modular process plant complex 1 comprises three plants P1, P2 and P3, each of which is separated into different plant areas PA1.1 to PA 3.3 which are indicated by dashed lines. The process plant complex 1 comprises a plurality of interconnected process modules PM 1.1 to PM1.N which are located in the plant areas PA1.1 to PA 1.3 of the first plant P1. Further process modules PM2.1 to PM 2.N are located in the second plant area PA 2.1 to PA 2.3 of the second plant P2 and process modules PM 3.1 to PM 3.N are located in the plant areas PA 3.1 to PA 3.2 of the third plant P3.

Each of the process modules PM1.1 to PM 1.N, PM2.1 to PM 2.N and PM3.1 to PM3.N includes a plurality of interconnected physical control objects 4 like pumps, control valves, chemical reactors sensors etc. which are electrically connected to a host computer 6 by a known industrial bus system 8, like a MOD-Bus or LON-Bus or an Ethernet-TCP-IP based bus system as it is disclosed in EP 1611 713 A1. The electrical connections of the industrial bus system 8 are only schematically shown by doted lines in FIG. 1.

As can be further seen from FIG. 1, an operator screen display 10 is connected to the central host computer 6 on which the physical control objects 4 and their interconnections inside each of the process modules PM1.1 to PM3.N can be displayed by means of a software program running on the central host computer 6 or alternatively on a separate computer (not shown). The host computer 6 which is only schematically indicated for reasons of simplification, processes the electronic data transmitted via the industrial bus system 8 between the physical control objects 4 and/or process modules and the host computer 6 represents a control system for controlling the plant complex 1.

Figure 2:
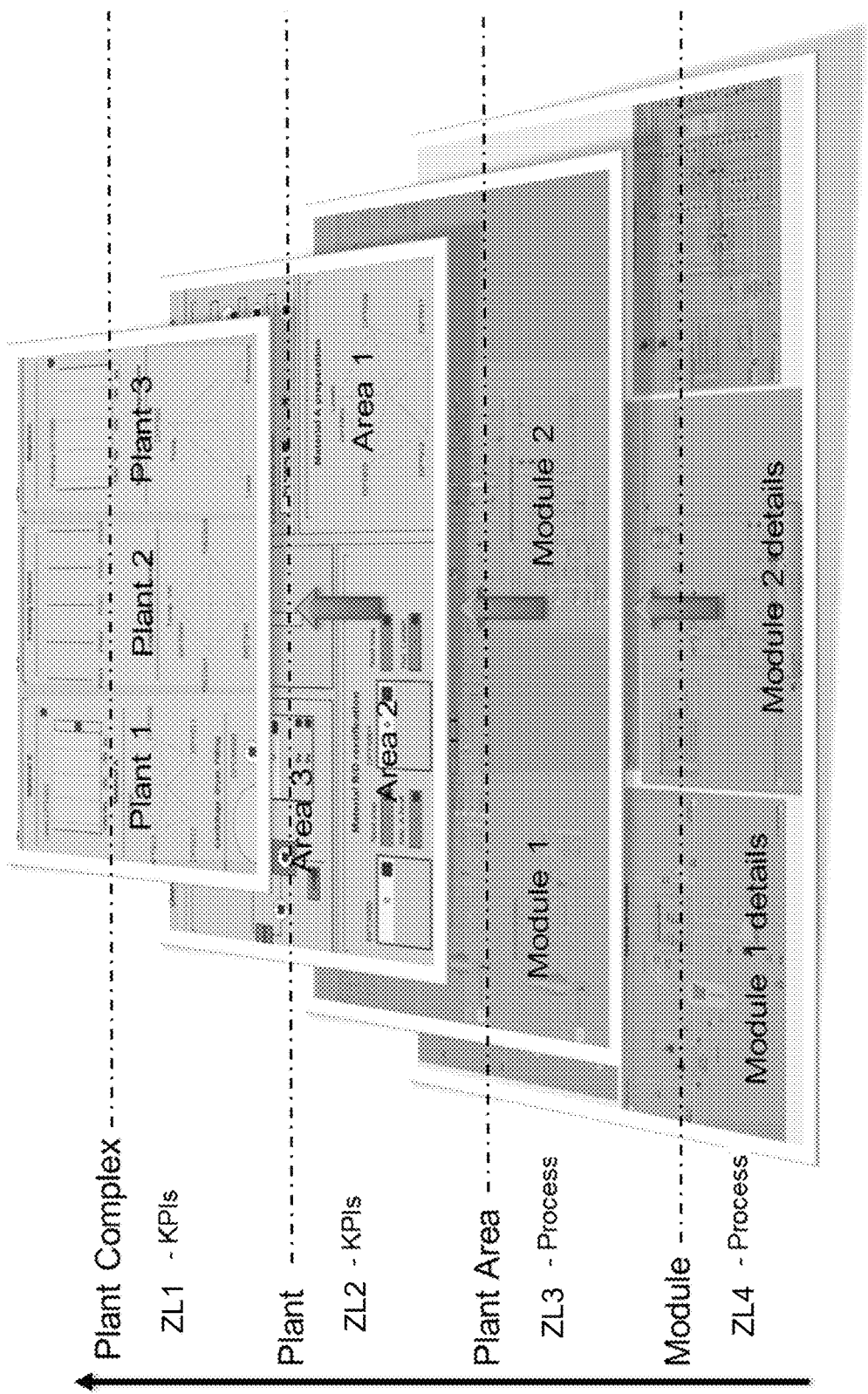
FIG. 2 is a schematic overview of four zooming levels and the associated information which can be displayed on the operator screen display of FIG. 1.

The electronic data which also includes the control parameters that are generated by and transmitted to the physical control objects 4 is processed and displayed by the host computer 6 as stylized control objects on the operator screen display 10 in different zooming levels ZL1 to ZL 4, as it is shown in the overview of FIG. 2.

Figure 3A:
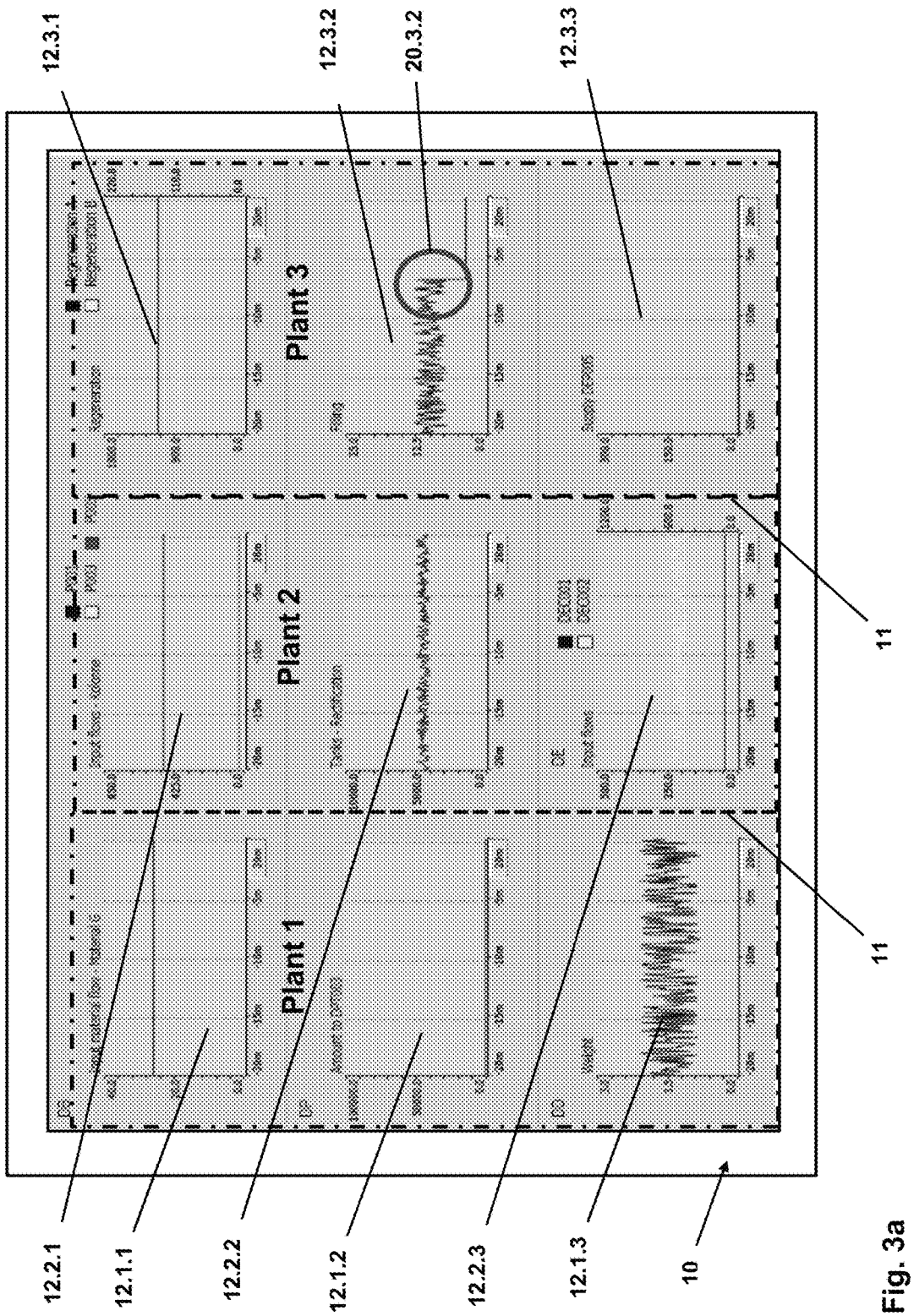
FIG. 3a is a detailed view of different aggregated KPIs and associated diagrams which are displayed on the operator screen display in the first zooming level according to the invention with the plant complex running in normal operation mode with no malfunctions.

In a first top zooming level ZL1 which is shown for an exemplary embodiment of a plant complex 1 in FIG. 3a, diagrams, preferably timelines 12.1.1 to 12.3.3 to of aggregated key performance indicators (KPIs) of the plant complex 1 are displayed on the operator screen display 10. The aggregated KPIs are aggregations of associated key performance indicators of physical process modules PM1.1 to PM3.N which are located in different plant areas PA1.1 to PA 3.2 of each plant P1 to P3 and which are calculated by the host computer 6 or a further computer system (not shown).

As it can further be seen from FIG. 3a in the first zooming level, the aggregated KPIs for each plant P1 to P3 of the plant complex 1 are preferably displayed on the operator screen display 10 together with separation means like the dashed lines 11, in order to make it easy for an operator to relate each KPIs to an associated plant P1 to P3. Alternatively the KPIs may be arranged in groups, so that the operator can intuitively assign an aggregated KPI to an associated Plant P1, P2 or P3.

Figure 3B:
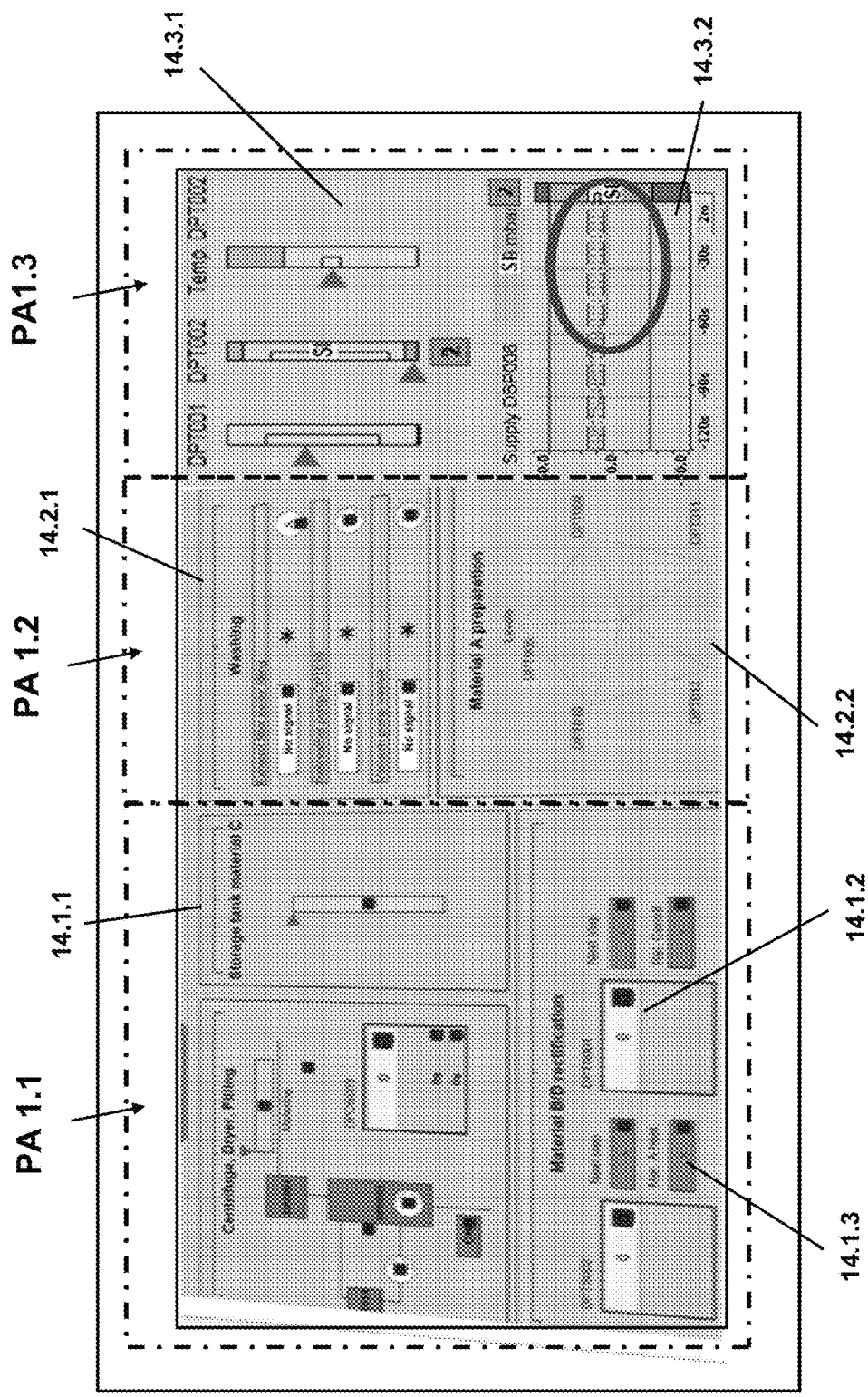
FIG. 3b is a detailed view of a plant area and the associated KPIs and diagrams which are displayed on the operator screen display in the second zooming level.

In a second zooming level ZL2 which is shown in more detail in FIG. 3b and to which the operator can get by clicking in one of the plants P1,P2, P3 or on an aggregated KPI diagram 12.1.1 to 12.3.3 in the first zooming level ZL1, the KPI diagrams 14.1.1 to 14.3.2 of the associated process modules M1.1 to M3.N from which the aggregated KPIs in the first zooming level ZL1 are generated by aggregation, e.g. by computing the sum of the KPIs of all modules in one of the plant areas PA1.1 to PA3.2 are displayed together with stylized images of the associated plant area PA1.1 to PA3.2 in which the associated process modules PM1.1 to PM 3.N are located.

Figure 3C:
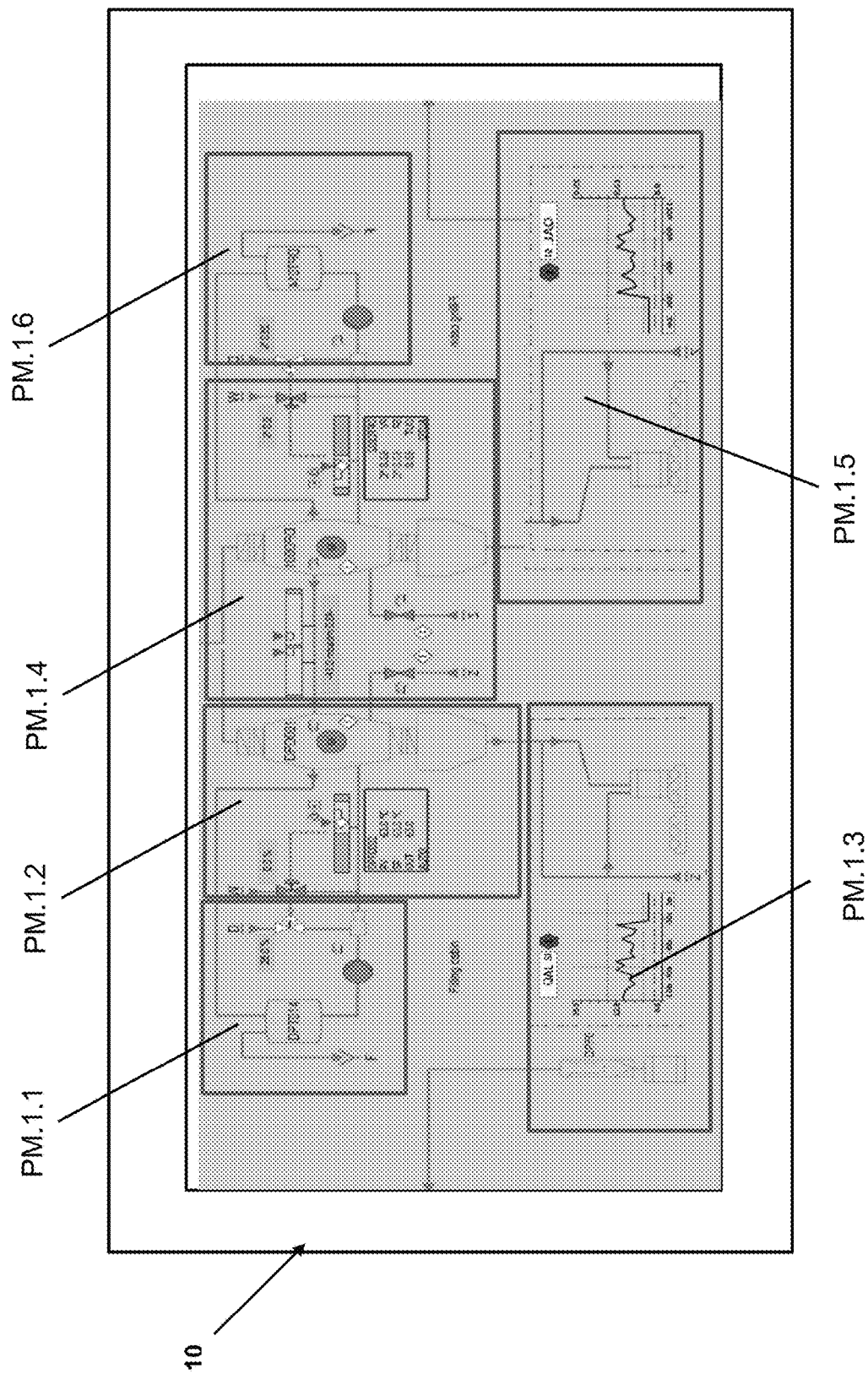
FIG. 3c is a view of the operator screen display displaying the stylized process modules and included stylized control objects located in one of the plant areas of FIG. 3b in the third zooming level.

Moreover, as indicated in FIG. 2 and FIG. 3c, in a third zooming level ZL3, to which the operator can get by clicking on one of the plant areas PA1.1 to PA3.3 in the second zooming Level ZL2 (in the displayed case on PA1.3), the process modules PM1.1 to PM 1.6 associated to the plant area PA 1.3 elected in the second zooming level ZL2 and the physical control objects 4 included in each of the process modules PM1.1 to PM 1.6 are displayed on the operator screen display 10 as low detail images.

As it is shown in FIG. 3c, the low detail images of the process modules PM can also include diagrams, preferably timelines of control parameters or sensor data of the control objects 4 that are included in one of the process modules PM1.1 to PM 1.6.

Furthermore, in a fourth zooming level ZL4, to which the operator can get by clicking in one of the process modules PM 1.2 to PM 1.6 (in this case process module 1.6) which are displayed in low detail in the third zooming level ZL3, the physical control objects 4 which are included in the selected process module PM 1.6 are displayed together with the associated control parameters and interconnections as stylized control objects on the operator screen display 10 with all details. The details displayed in the fourth zooming level ZL4 may also include but are not limited to the data which is needed to control each control object 4, the specific logical interconnections and physical piping and wiring between the control objects 4, flow directions of media running through the control objects, as well as the measured sensor data which is taken.

In the preferred embodiment of the invention, the operator can alter the control parameters by selecting a control object in the fourth zooming level, in order to make corrections to the parameters of that control object. In other words, the operator can for example increase or decrease the speed of a motor or the pressure in a pipe or the flow rate per time unit or any other control parameter in a respective control object or even in an entire process module.

According to another object of the present invention, the control parameters in each of the physical control objects 4 of each process module PM 1.1 to PM 3.N are monitored e.g. by the host computer 6 and an alarm signal is generated for that control object 4 if one or more of the control parameters exceed a predefined threshold value, as it is e.g. shown in KPI diagram 12.3.2 of FIG. 3a, in which the KPI representing the filling of a substance produced has suddenly dropped from a fluctuating relative value of about 12.5 to a constant relative value of only 5.

Figure 4:
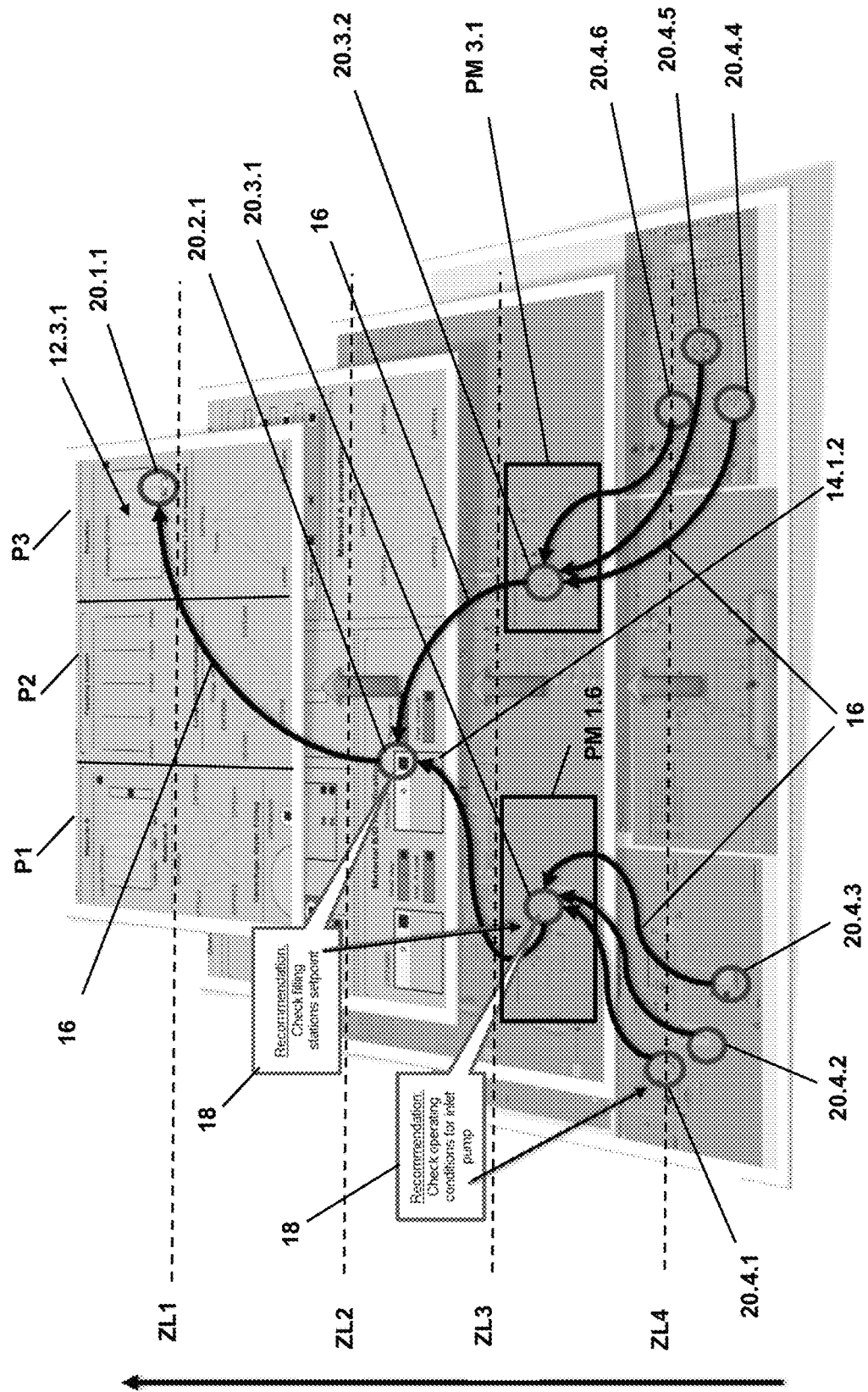
FIG. 4 is a view of the operator display screen showing the propagation of associated alarm signals from the fourth zooming level to the first zooming level in an overlapping image of the four zooming levels in case of a malfunction.

As it can be seen from FIG. 4, alarm signals 20.1.1, 20.2.1, 20.3.1, 20.3.2 and 20.4.1-20.4.6 are displayed on the operator screen display 10 in the first, second, third and fourth zooming level ZL1 to ZL4, in case of a malfunction in one or more of the control objects 4 which eventually lead to a sudden change of the associated KPI 12.3.1 which is displayed in the first zooming level ZL1. In order to reduce the amount of information displayed, the alarm signals 20.4.1, 20.4.2 and 20.4.3 of the control objects 4 which caused an alarm in the fourth zooming level ZL4 on the left hand side of FIG. 4 are aggregated (combined) to a single alarm signal 20.3.1 which is displayed in the low detail stylized image of the associated process module PM1.6 in the third zooming level ZL3.

In the same way, the three control objects 4 of FIG. 4 which caused the alarm signals 20.4.4, 20.4.5 and 20.4.6 on the right hand side of the fourth zooming level of FIG. 4 are aggregated (combined) to a single alarm signal 20.3.2 which is displayed in the low detail stylized image of the associated process module PM 3.1 in the third zooming level ZL3.

Generally speaking, the aggregation of the alarm signals 20 in each of the process modules PM to a single alarm signal which is displayed on the operator screen display 10 in the third zooming level ZL3 is possible, because the process topology and interlocks inside each process module PM of the plant complex 1 is known. The aggregated alarm signal is displayed in zooming level 3 at the place where the process module is located (FIG. 4).

In detail, the aggregated alarm signals 20.3.1 and 20.3.2 which are generated and displayed in the third zooming level ZL3 of the overlapping image in the way de-scribed before are aggregated or combined to one single double-aggregated alarm signal 20.2.1 which is displayed in or next to a diagram of a KPI which is generated by the process modules PM 1.6 and PM 3.1 of FIG. 4, in which the aggregated alarm signals 20.3.1 and 20.3.2 are displayed on the operator screen display 10.

As it can be further seen from FIG. 4, the double-aggregated alarm signal 20.2.1 which is displayed in the second zooming level ZL2 is also displayed as an aggregated alarm signal 20.3.1 in the diagram/timeline 12.3.1 which displays the aggregated KPIs of the process modules located in the associated plant P3 of the plant complex 1 in the first zooming level ZL1.

Moreover, according to an optional feature of the present invention, the propagation of the afore described alarm signals can be displayed in the overlapping image of FIG. 4 by interconnecting lines 16 which may also be in the shape of arrows to indicate the propagation of an alarm signal, in order to make it easier for an operator to track the source of an alarm. Accordingly, an alarm route through the overlapping images of the different zooming levels ZL1 to ZL4 is displayed on the operator display screen 10 in which the alarms follow a similar approach as described herein before.

According to another embodiment of the invention which is not shown in the drawings, the alarms can be generated and displayed by means of cause and effect matrixes in order to find the malfunction which caused an alarm. The operator could be guided to the possible failure in the control logic.

As it is indicated in FIG. 4 by the rectangular pop-up-signs 18, the host computer 6 may also retrieve a recommendation for corrective action which was previously stored in a data base (not shown) and displayed on the operator screen display 10 next to an alarm signal which is displayed in the overlapping image of zooming levels as it is shown in FIG. 4. In other words, when leaving the normal operation state which does not necessarily mean that alarms are raised, it is possible to recommend corrective actions. The aggregated information can be used to decide whether corrective actions are necessary.

Based on the topology of the modules, the process topology can be derived that is used to find dependencies between KPIs and equipment. The dependencies can be used to recommend corrective actions to the user for bringing back the process into a normal operation state.

Figure 3D:
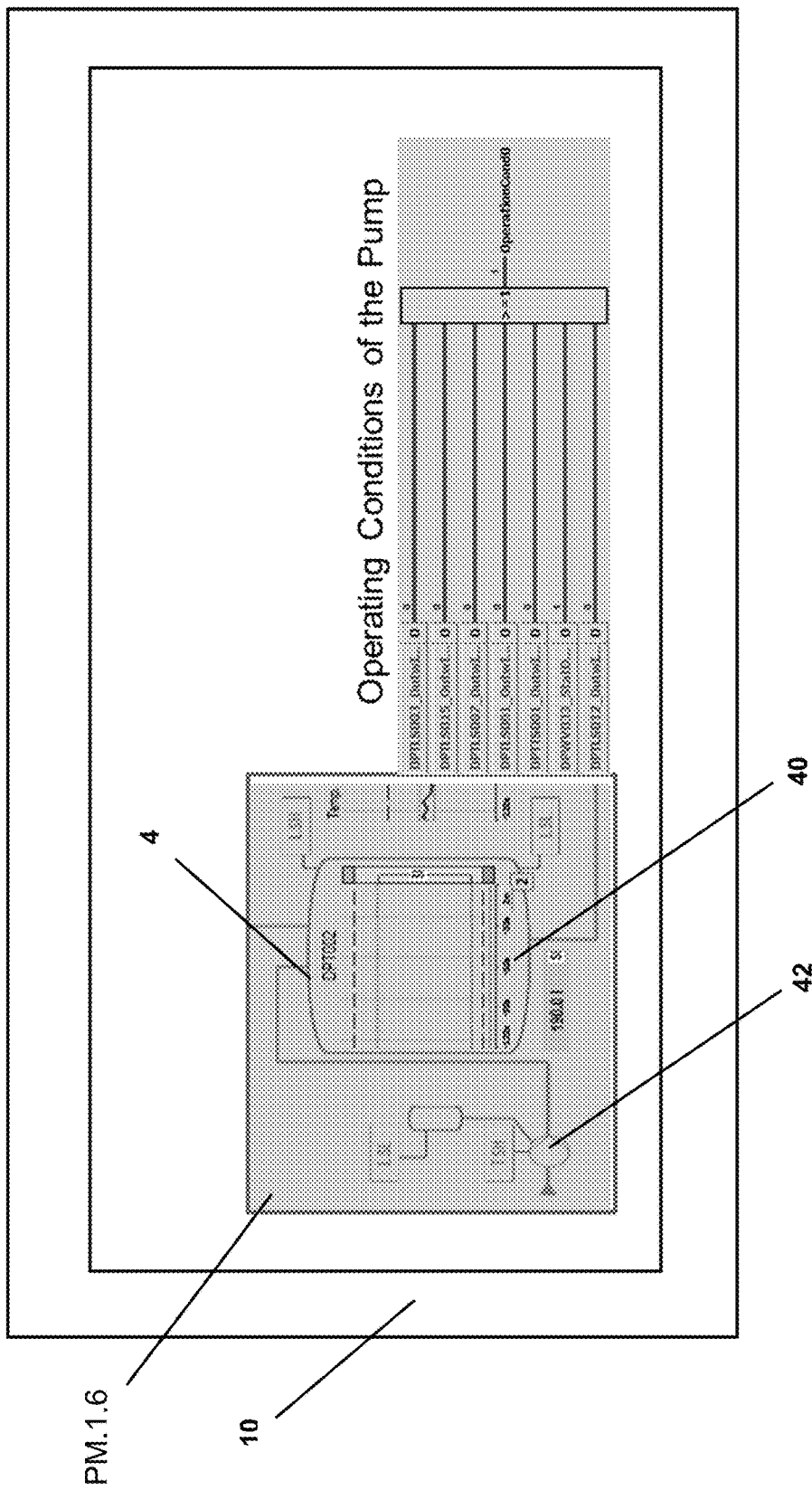
FIG. 3d is a view of the operator display screen displaying the fourth zooming level with the physical control objects and associated control parameters included in a process module.

As it is indicated in FIG. 3d, the operator can further zoom into the associated process module PM 1.1 to PM 3.N and get more detailed information about the cause which initiated the displaying of a corrective action on the operator screen display 10. As shown in FIG. 3d, the operator might be informed that the level of the vessel 40 in PM 1.6 is low and the pressure on the pump 42 is low too. Both alarms have been aggregated inside the module PM 3.1 to a single alarm signal 20.3.2 that is displayed in form of a double-aggregated alarm signal 20.2.1 on the second zooming level ZL2 and as an triple-aggregated alarm signal 20.1.1 on the first zooming level ZL1 (FIG. 4).

When going that deep into the process graphics, the normal procedure to execute corrective action by watching the operating conditions, etc. can be done. The same procedure can be used when a KPI runs out of normal operation, without raising an alarm. The operator can dig down into the process topology in the same manner as described herein above.

Additionally, the aforementioned aggregations of alarm signals may be used to propose corrective actions for the operator. Already in the second zooming level ZL2, the process control system which is schematically represented by the host 6 could give hints, like "Check filling stations set point", because the supply tanks which are shown in the previous third zooming level ZL3 might be used to fill the vessel 40. If the action has been done without result, the operator can dig down and do the recommendations displayed in the third zooming level ZL3, which are displayed in the pop-up-signs 18 "Check operating conditions for pump xyz".

After doing this, the operator can go to the next recommendation if the problem is still unsolved.

As a further option, the host computer 6 can also propose corrective actions already before an alarm appears. When using the KPI based operator displays of the first zooming level ZL1, the process data is reduced to the most important values, sometimes by aggregation, calculation process values to a certain KPI. The operator can already be informed when this aggregated KPI runs out of a certain limit, so that already at this early stage, corrective actions can be proposed by the host computer 6.

In order to carry out the corrective actions the operator has to select the associated control object 4 in the corresponding process module PM and alter the desired parameter, e.g. the pump pressure. This can be achieved by moving an associated bar in a pictogram which is displayed on the operator screen display up and down to a desired value.

What is claimed is:

1. A system for monitoring a modular process plant complex, comprising:
    a plurality of interconnected process modules each of which includes a plurality of interconnected physical control objects, the physical control objects and their interconnections inside a physical process module are displayed together with associated control parameters as stylized control objects on an operator display screen in different zooming levels;
    in a first zooming level with least detail information, diagrams of aggregated key performance indicators of the plant complex are displayed on said operator display screen, the aggregated key performance indicators being aggregations of associated key performance indicators of the physical process modules located in different plant areas;
    in a second zooming level, diagrams of the key performance indicators are displayed together with stylized images of the associated plant areas on the operator display screen;
    in a third zooming level, the process modules associated with a plant area of said second zooming level and the physical control objects included in each of the process modules are displayed as stylized process modules and stylized control objects in a stylized view of said plant area; and
    in a fourth zooming level, one or more physical control objects included in a process module of said third zooming level are displayed together with the associated control parameters and interconnections as stylized control objects on the operator display screen;
    wherein the control parameters in each of the physical control objects of each process module are monitored and an alarm signal is generated for a control object if the control parameter associated with the control object passes a predefined threshold value;
    the alarm signals of all physical control objects included in a process module are aggregated to an aggregated alarm signal, and the aggregated alarm signal is displayed inside or next to the stylized process module which includes the physical control object that generated the alarm signal on the operator display screen in said third zooming level;
    wherein aggregated alarm signals of two or more process modules each having at least one physical control object that generated an alarm signal are aggregated to a double-aggregated alarm signal, and the double-aggregated alarm signal is displayed inside or next to a stylized image of the associated plant area in said second zooming level, which includes the process modules that generated the double-aggregated alarm signal in said third zooming level;
    wherein at least two zooming levels are displayed on the operator display screen as an overlapping image and the propagation of at least one of an alarm signal, an aggregated alarm signal, and a double-aggregated alarm signal between the at least two zooming levels is displayed on the operator display screen with a connecting line.

2. The system of claim 1, wherein in said first zooming level, the diagrams of the aggregated key performance indicators are selectable with an electronic pointing device in order to display a subsequent zooming level with an increased detail information on said operator display screen.

3. The system of claim 1, wherein the double-aggregated alarm signals of at least two plant areas that include physical control objects which generated an alarm signal are aggregated to a triple-aggregated alarm signal which is displayed next to the diagram of a KPI that is associated with the plant areas in said first zooming level.

4. The system of claim 1, wherein the connecting line interconnects two or more of the stylized control objects in which an alarm signal was generated in the overlapping image of the fourth zooming level with an associated aggregated alarm signal in or next to a process module in said third zooming level.

5. The system of claim 1, wherein in the overlapping images displayed on the operator display screen, a connecting line interconnects an aggregated alarm signal displayed inside or next to a process module in said third zooming level with an associated double-aggregated alarm signal displayed inside or next to an associated stylized image of the associated plant area or key performance indicator in said second zooming level.

6. The system of claim 1, wherein in the overlapping images displayed on the operator display screen, a connecting line interconnects a double-aggregated alarm signal displayed inside or next to an associated stylized image of the associated plant area in said second zooming level with a triple aggregated alarm signal displayed next to the diagram of a key performance indicator in said first zooming level.

7. The system of claim 1, wherein the alarm signals are displayed in combination with a cause and effect matrix on the operator display screen.

8. The system of claim 1, wherein the key performance indicators displayed in the first and second zooming levels are monitored, and an alarm signal is generated and displayed if a key performance indicator passes a predefined upper or lower threshold value; and
    based on the key performance indicator and alarm signal, a recommendation for corrective action is retrieved from a memory and displayed on the operator display screen.

9. The system of claim 1, wherein said control parameters associated with at least one of the control objects can be altered by electing the associated control object and the control parameter displayed on the operator display screen with an electronic pointing device.

10. The system of claim 1, wherein in said second zooming level the diagrams of key performance indicators in the associated plant areas are selectable with an electronic pointing device in order to display a subsequent zooming level with an increased detail information on said operator screen display.

11. The system of claim 1, wherein in said third zooming level the stylized process modules in said stylized view of said plant area are selectable with an electronic pointing device in order to display a subsequent zooming level with an increased detail information on said operator screen display.

12. A system, comprising:
a computer;
a display connected to the computer;
software executable by the computer to generate a window on the display;
a user input for transitioning the window between at least four zoom levels;
in a fourth zoom level, the window displays objects for first and second physical process modules having first and second physical control objects with first and second control parameters, respectively;
in the third zoom level, the window displays a view of a first plant area with the displayed objects for the first physical process module and the first and second physical control objects thereof;
in the second zoom level, the window displays an image of the first plant area together with a first diagram of a first KPI of the first physical process module, and an image of a second plant area together with a second diagram of a second KPI of a second physical process module within the second plant area;
in the first zoom level, the window displays a diagram of an aggregated KPI representing an aggregation of the first and second KPIs;
wherein the software is further executable to:
generate a first alarm signal if the first control parameter of the first physical control object passes a first predefined threshold value, and a second alarm signal if the second control parameter of the second physical control object passes a second predefined threshold value;
aggregate the first and second alarm signals to form a first aggregated alarm signal, and display the first aggregated alarm signal in the third zoom level;
aggregate the first aggregated alarm signal of the first physical process module and a second aggregated alarm signal of the second physical process module to form a double-aggregated alarm signal, and display the double-aggregated alarm signal in the third zoom level; and
display at least two of the zoom levels as an overlapping image, and a connecting line indicating propagation of at least one of an alarm signal, an aggregated alarm signal, and a double-aggregated alarm signal between the at least two zooming levels.

13. The system of claim 12, wherein in said first zooming level, the diagram of the aggregated key performance indicator is selectable via the user input for transitioning the window to the second zoom level.

14. The system of claim 12, wherein the double-aggregated alarm signals of at least two plant areas are aggregated to a triple-aggregated alarm signal, and the software is further executable to display triple-aggregated alarm signal next to the diagram of the aggregated key performance indicator in said first zooming level.

* * * * *